United States Patent
Fontana et al.

(10) Patent No.: US 6,361,326 B1
(45) Date of Patent: Mar. 26, 2002

(54) SYSTEM FOR INSTRUCTION THINKING SKILLS

(75) Inventors: Lynn A. Fontana, Oakton, VA (US); Ward M. Cates, Center Valley, PA (US)

(73) Assignee: George Mason University, Fairfax, VA (US)

( * ) Notice: Subject to any disclaimer, the term of this patent is extended or adjusted under 35 U.S.C. 154(b) by 0 days.

(21) Appl. No.: 09/252,999

(22) Filed: Feb. 19, 1999

Related U.S. Application Data
(60) Provisional application No. 60/075,434, filed on Feb. 20, 1998.

(51) Int. Cl.[7] .................................................. G09B 7/00
(52) U.S. Cl. ...................... 434/322; 434/323; 434/236
(58) Field of Search ................................ 434/236, 322, 434/323

(56) References Cited

U.S. PATENT DOCUMENTS

| | | | | |
|---|---|---|---|---|
| 5,395,243 A | * | 3/1995 | Lubin et al. ............. | 434/118 X |
| 5,616,033 A | * | 4/1997 | Herwin .................... | 434/118 X |
| 5,727,950 A | * | 3/1998 | Cook et al. ................... | 434/350 |
| 5,890,911 A | * | 4/1999 | Griswold et al. ........ | 434/322 X |
| 5,904,485 A | * | 5/1999 | Siefert .................... | 434/322 X |
| 5,911,581 A | * | 6/1999 | Reynolds et al. ........ | 434/236 X |
| 6,019,607 A | * | 1/2000 | Jenkins et al. ........... | 434/116 X |
| 6,052,512 A | * | 4/2000 | Peterson et al. ......... | 709/220 X |
| 6,120,297 A | * | 9/2000 | Morse, III et al. ....... | 434/169 X |
| 6,120,298 A | * | 9/2000 | Jenkins et al. ........... | 434/236 X |
| 6,198,904 B1 | * | 3/2001 | Rosen .................... | 434/307 R |

OTHER PUBLICATIONS

IDA Ehrlich, Instant Vocabulary, 1968, SImon & Schuster, New York, NY.
John H. Clarke, Patterns of thinking: Integrating learning skills in content teaching 1990, pp. 3–4, Allyn & Bacon, Boston, MA.
Stephen M. Alessi, Stanley R. Trollip, Computer–Based Instruction, Methods and Development, 1985, 106, Prentice Hall, Englewood, NJ.
Stephen M. Alessi, Stanley R Trollip, Computer–Based Instruction, Methods and Development (2nd ed.), 1985, 47, Prentice Hall, Englewood, NJ.
Apple Computer, Inc., HyperCard Stack Design Guidelines, 1989, 40, Addison–Wesley, Reading, MA:.
C. Marlin "Lin" Brown, Human–Computer Interface Design Guidelines, 1988, 120, Ablex Publishing Corporation, Norwood, NJ.
John H. Clarke, Patterns of thinking: Integrating learning skills in content teaching, 1990, 141, Allyn & Bacon, Boston, MA.

(List continued on next page.)

*Primary Examiner*—Joe H. Cheng
*Assistant Examiner*—Chanda Harris
(74) *Attorney, Agent, or Firm*—David Grossman; Richard Lebovitz

(57) ABSTRACT

The present invention relates to methods and systems for teaching thinking skills. A user can be provided with information and then presented with questions and examples which enable the user to investigate the usefulness of the information and analyze its content, meaning, and point of view. The questions and examples are designed to develop thinking skills in the user, permitting the user to simultaneously learn the information while acquiring skills in thinking.

19 Claims, 15 Drawing Sheets

OTHER PUBLICATIONS

Robert M. Gagne, The Conditions of Learning and Theory of Instruction (4th ed.), 1985, 252–254, Holt, New York.

Wilbert O. Galitz, The Essential Guide to User Interface Design, 1997, 247, 443, Wiley & Sons, New York, NY.

Alison J. Head, Design Wise, A Guide for evaluating the interface design of information resources, 1999, 86.

Charles Heimler, James Cunningham, Michael Nevard, Authoring Educational Software, 1987, 109.

Jenny Preece, System and Interface Features, in A guide To Usability, Human Factors In Computing, 1993, 77, Addison-–Wesley, Reading, MA.

Lauren B. Resnick, Leopold E. Klopfer, Toward the Thinking Curriculum: An Overview, in Toward the Thinking Curriculum: Current Research, 1989, 1, Association and Curriculum Development, USA.

Barbara Rogoff, Apprenticeship in thinking: Cognitive development in social context, 1990, 94, Oxford University Press, New York, NY.

Michael R. Simonson, Ann Thompson, Educational Computing Foundations, 1997, 365, Prentice–Hall, Inc., Upper Saddle River, NJ.

* cited by examiner view sources

○ as images
⊙ as a titles list

⊙ sorted by title
○ sorted by date
○ sorted by type show

⊙ all sources

○ editors suggested sources for . . .

○ specific sources by keyword . . .

eject disc

Click on a source to choose it:    △ Prev  ▽ Next

| Short Title | Date | Type |
|---|---|---|
| "box" Brown | 1850 | pict |
| 1850's Timeline | 1998 | text |
| 8 Resolutions | January 29, 1850 | pict_text |
| Ain't I Woman? | 1851 | text |
| Anothony Burns | 1856 | pict |
| Anthony Speech | 1859 | pict_text |
| Antislavery Mtg. | 1851 | pict |
| Boy's Journal | 1850 | text |
| Brown's Raid | 1859 | pict_text |
| CA Statehood | March 25, 1850 | pict_text |
| Calhouncirca | 1850 | pict |
| Calhoun Speech | March 4, 1850 | pict_text |
| Canal Wages | 1845-1870 | pict |
| Caning-Con | May 23, 1856 | text |
| Caning-Pro | May 29, 1856 | text |

| Print notebook ▷ | Click on the buttons below to investigate this source: | | ANALYSIS |
|---|---|---|---|
| | New Source | | ○ Content |
| | EVALUATION | Title: Editorial on John Brow's Raid (Antislavery view) | ○ Meaning |
| | ○ Relevance | Date: December 1, 1859 | ○ Point of View |
| | ○ Credibility | PRODUCER:_(Albany, New York) Evening Journal_ | |
| | ○ Consistency | SOURCE: "The Execution of John Brown" in the _(Albany, New York) Evening Journal_, December 1, 1859. Included in Furman University, _Nineteenth Century Documents Project_, available online at http>// www.furman.edu/_benson/docs/nyajjb25.htm | |
| | ○ Bias | | |
| | ○ Accuracy | ANNOTATION: John Brown(1800-1859) was a fanatical abolitionist who believed that violence was necessary. In hiding since he led a massacre at Pottawatomic Creek. | |
| | ○ Ambiguity | | |
| | ○ Facts vs Opinion | △1▽ | |
| Display area for notebook, clarifications, definitions | | More Info.  Read it | |
| | | Guiding Questions | |
| | | Control area for Guiding Question buttons. | |
| 1 | | | |
| Eject Disc ▷ | Find Definition | | |

FIG. 8

Click on the buttons below to investigate this source:

△ Print notebook ▷

TITLE: F. Douglass

DATE: 1994

COPYRIGHT: obtain information

LOCATION: found in Sourcs folder on the CD-ROM

New Source

EVALUATION
- ○ Relevance
- ● Credibility
- ○ Consistency
- ○ Bias
- ○ Accuracy
- ○ Ambiguity
- ○ Facts vs Opinion Video source displayed here.

Pause

More info | Play | Read It

Guiding Questions
Is the producer of the source an expert on the topic?
Was the producer close to the occurance?
Did the producer gain anything from the work?
How was a source produced?
Under what conditions was it produced?

ANALYSIS
- ○ Content
- ○ Meaning
- ○ Point of View

Eject Disc ▷ | 1 | Find Definition

FIG. 11

| Show notebook ▽ | Click on the buttons below to investigate this source: | | |
|---|---|---|---|
| No exact match found. | New Source | | |
| | EVALUATION | supported the Republican Party, formed in 1854, while the remaining conservatives went with the small and short-lived American Party, popularly called Know-Nothings. John C. Fremont was a soldier, explorer, and a firm opponent of slavery. In the election of 1855 he won 1,340,000 votes and lost to Democratic candidate James Buchanan with 1,830,000 votes.<br><br>KEYWORDS: John C. Fremont, presidential elections, presidential election campaigns, campaign songs, slavery<br><br>COPYRIGHT: unrestricted<br><br>HELD BY: Smithsonian Folkways Records | |
| 1 associated entry found for Know-Nothings. | ○ Relevance | | |
| | ○ Credibility | | |
| ――― | ○ Consistency | | |
| Know Knothing Party | ○ Bias | | |
| American political party formed in the 1850s to express anti-immigrant and anti-Catholic sentiments. | ○ Accuracy | | |
| | ○ Ambiguity | | |
| | ○ Facts vs Opinion | ◁ 2 ▽ | ANALYSIS |
| | | | ○ Content |
| | | Play │ Read It | ○ Meaning |
| ――― | | | ○ Point of View |
| 1 | | | |
| Eject Disc ▽ │ Hide Definition | | | |

FIG. 12

Click on the buttons below to investigate this source:

New Source

There's right and wrong in parties,
and the Right is on our side
So let us mount the wagons, boys,
And let the nation ride!
The Union is oue wagon
And the PEOPLE are its spring --
And every true American
For Millard Filmore sings.

CHORUS
Wait for the wagon,
Wait for the Wagon,
Wait for the Wagon,
And we'll all take a ride.

EVALUATION
- ○ Relevance
- ● Credibility
- ○ Consistency
- ○ Bias
- ○ Accuracy
- ○ Ambiguity
- ○ Facts vs Opinion More info | Play

Guiding Questions
Is the producer of the source an expert on the topic?
Was the producer close to the occurance?
Did the producer gain anything from the work?
How was a source produced?
Under what conditions was it produced?

ANALYSIS
- ○ Content
- ○ Meaning
- ○ Point of View

△ 1 ▽

◁ Cancel Print ▽

Experts study and learn about specific topics. This study means they know more facts and more about events and concepts related to those topics. They also know how to gather and analyze information about their specialized subject. And, they know how to look at the methods used to produce a source and consider how it fits with other information in their field. Because experts know more, we still need to be careful. An expert on one topic is not necessarily an expert on another topic. For example, a paleontologist who is an

1

Eject Disc ▽ | Find Definition

FIG. 14

SYSTEM FOR INSTRUCTION THINKING SKILLS

This application is a continuation-in-part of U.S. Provisional Application 60/075,434, filed Feb. 20, 1998, which is hereby incorporated by reference.

BACKGROUND OF THE INVENTION

Teaching thinking skills is a high priority and challenge for schools and other educational facilities in the information age. Learners must acquire the ability to evaluate, analyze, and synthesize information present in a wide variety to forms, including text, graphics, and audio materials. Not only is this information obtainable in diverse forms, but it can be stored on equally diverse sources, e.g., CD-ROM, World Wide Web, Internet, DVD, floppy disks, etc. Consequently, the acquisition of the skills necessary to effectively handle such large amounts of information is crucial for achieving success in the school, workplace, and day-to-day activities.

To enhance thinking skill teaching, instructor must use innovative and engaging strategies into the curriculum. Providing educational tools to assist learners in acquiring thinking skills is a major task confronting educators today.

BRIEF DESCRIPTION OF THE DRAWINGS

FIG. 2 shows sources displayed by title;

FIG. 3 shows sources sorted by date;

FIG. 8 is a display of a text file;

FIG. 11 is the display of a video in a "video" environment;

FIG. 12 is a screen showing the definition/glossary function in a in a "text" environment;

FIG. 14 shows the display of a text file which is associated with an audio file.

DESCRIPTION OF THE INVENTION

The present invention relates to instructional database systems, products, and methods for teaching thinking and cognitive processing skills to users. In preferred embodiments of the present invention, the user, such as a student or trainee, is presented with informational materials associated with guiding questions (and more detailed explanations or clarifications of the questions) designed to guide the user in developing thinking and cognitive skills. For instance, a user is presented with a textual information about the Civil War. After reading the information, the user selects programmed questions to answer which were created to evaluate the usefulness of the story and analyze its content, meaning, and point of view. These questions (also called "guiding prompts") enable a user to develop thinking and cognitive skills that are generally applicable to the world while learning the information at the same time.

Figure 1:
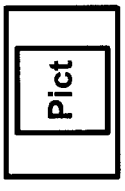
FIG. 1 is a screen displaying the various sources that can be chosen by a user. Each icon represents a source. A source can be opened by clicking on the icon with the mouse. For example, the bottom left icon is a small thumbnail, an anti-slavery meeting. By clicking on it, the user is brought to a file containing a picture of an anti-slavery meeting.
Figure 5:
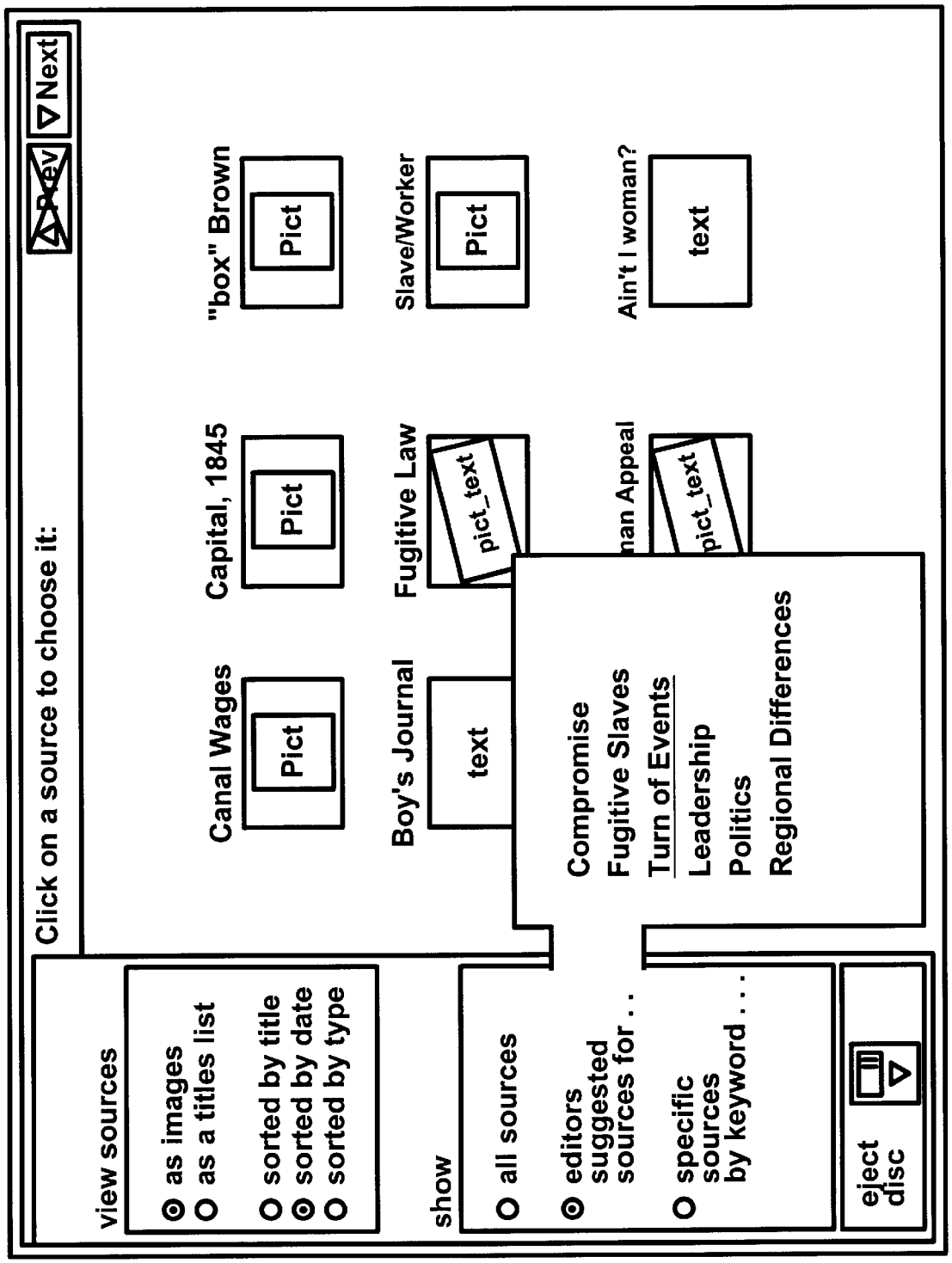
FIG. 5 shows the display of a subset of sources based on "editor's suggestions"
Figure 7:
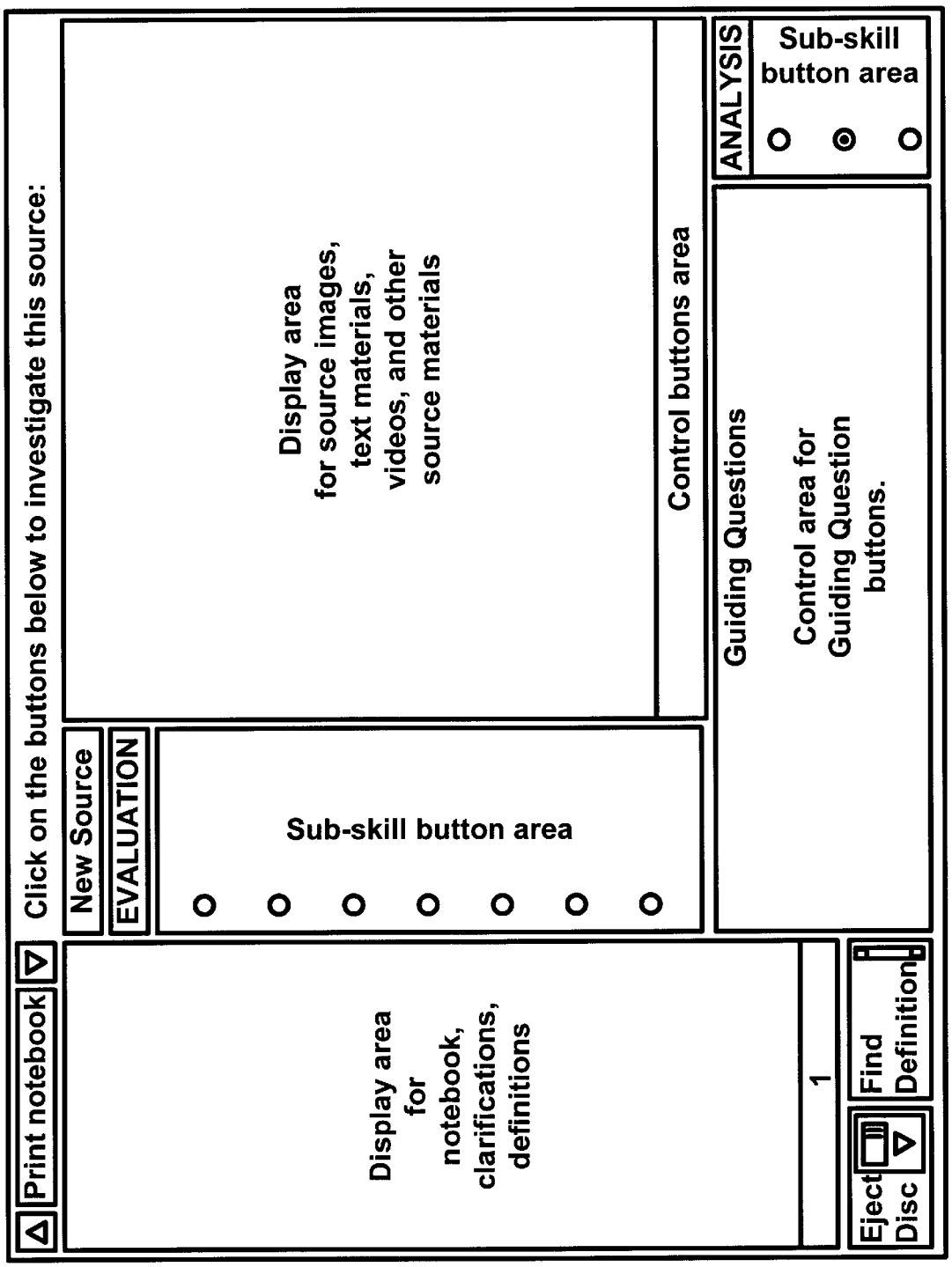
FIG. 7 shows the various display areas and control area for Guiding Questions.
Figure 9:
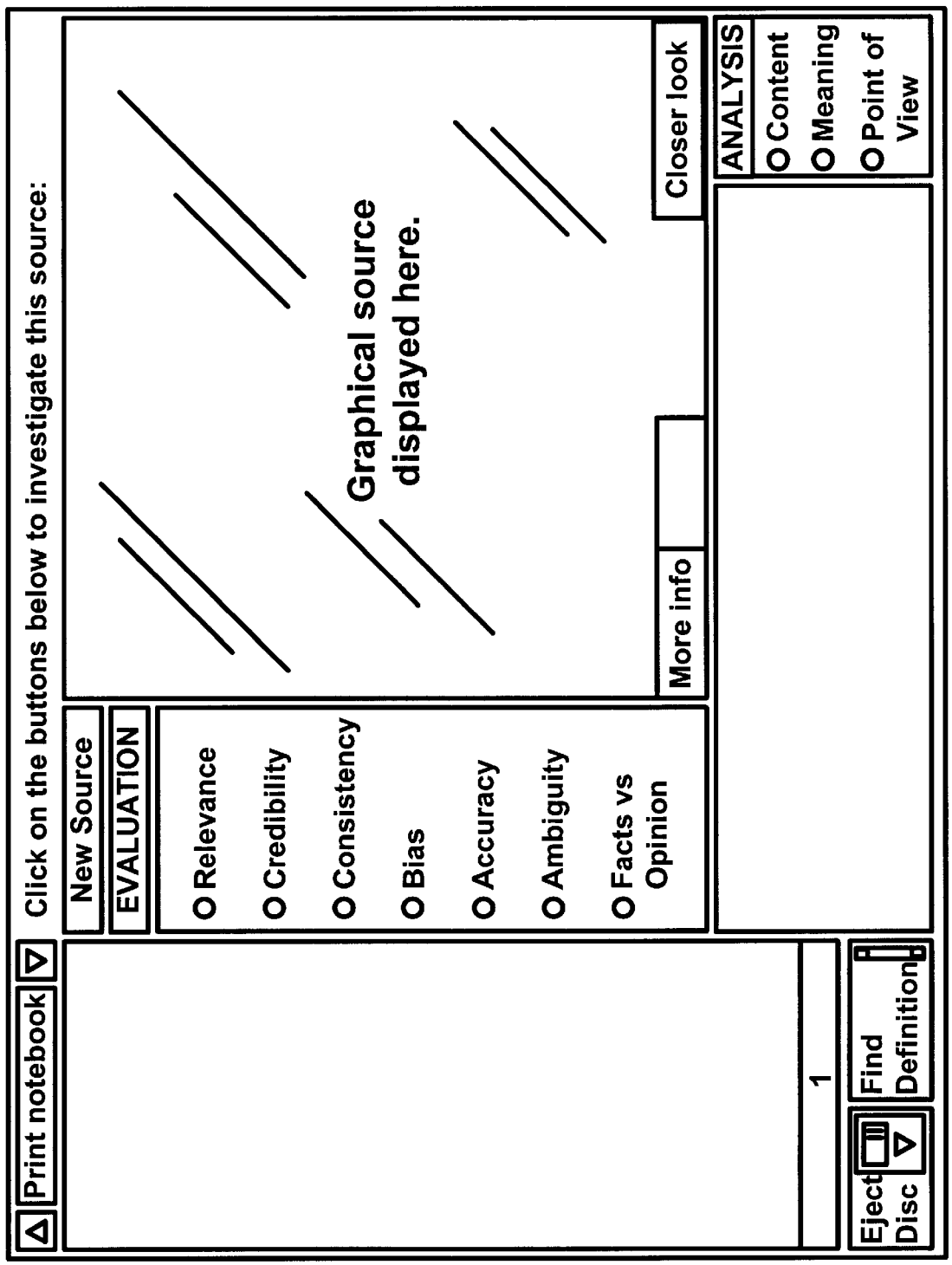
FIG. 9 shows the display area for a graphical image and a lower right hand button which, when selected, shows a zoom view of the image.
Figure 10:
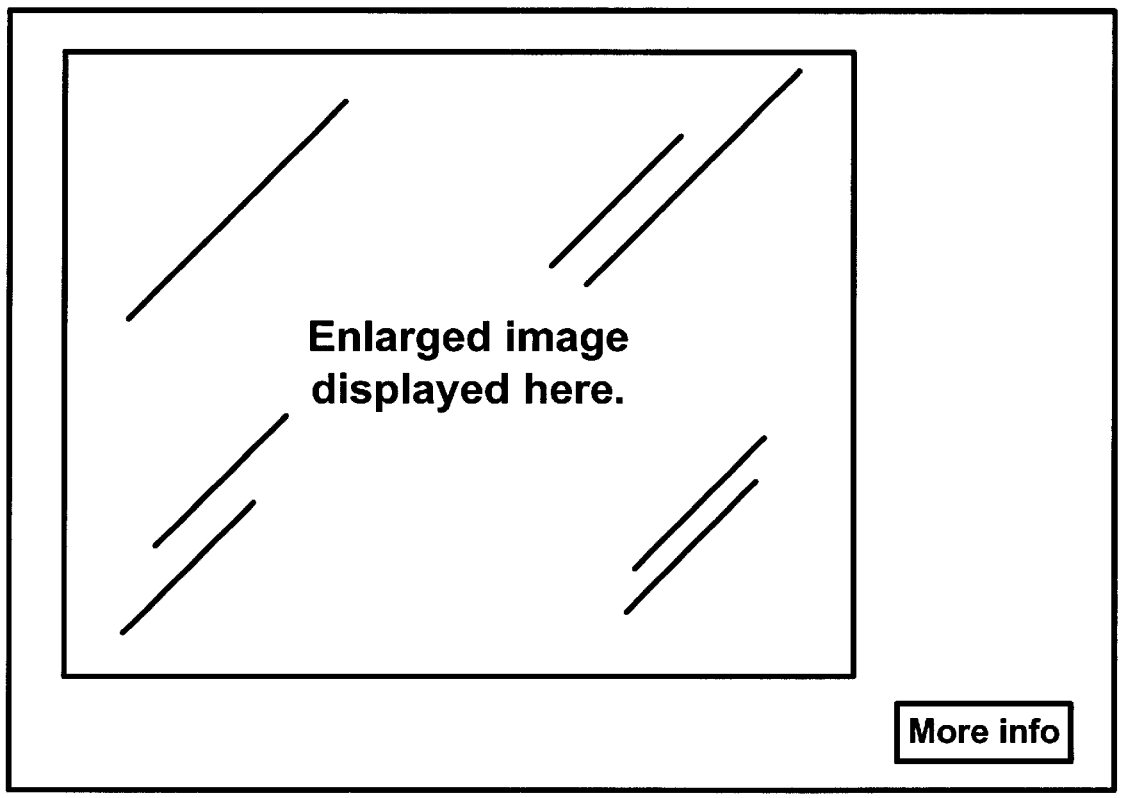
FIG. 10 shows the zoom view of an image when "closer look" button is selected.
Figure 13:
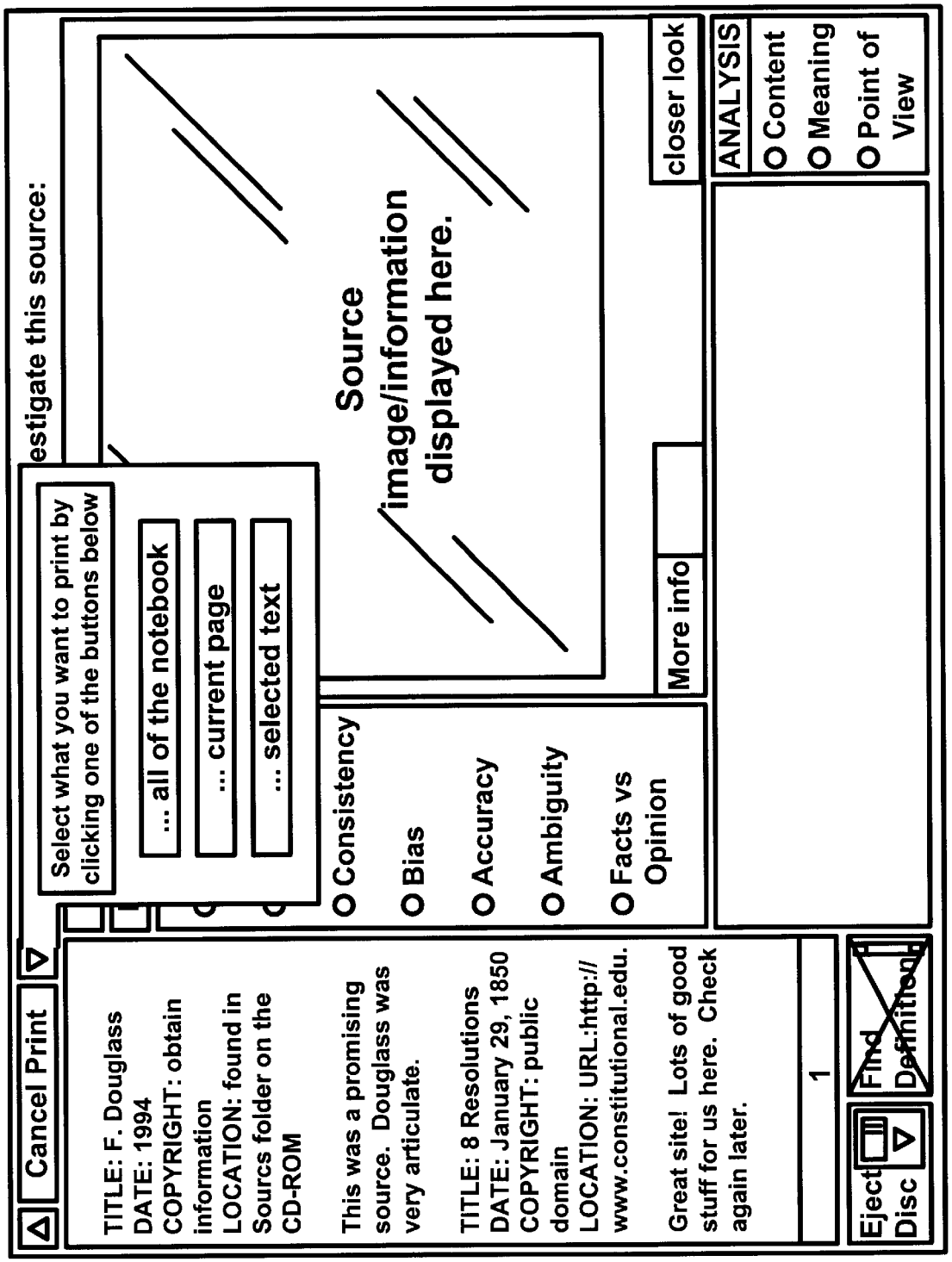
FIG. 13 reveals the print functions of the notebook.

In preferred embodiments, the invention is implemented by presenting a user with a menu of one or more sources of information or data from which to chose. An illustration is shown in FIG. 1 of such a menu. Each source is associated with specific informational material, e.g., a biography of George Washington or the content of the Constitution. To access the material, the user selects it from the menu, which results in the retrieval of the material, e.g., from a stored file or World Wide Web location. This is illustrated in FIGS. 7 and 8. Once the accessed material is displayed, the user investigates it using programmed prompts that lead the user, step-by-step, through the material. An example of textual material in combination with suitable programmed prompts is shown in FIG. 5.

In preferred embodiments, the prompts can be a series of programmed questions and examples designed to teach thinking skills in evaluation and analysis. These skills enable a user to investigate the usefulness of information for a variety of objectives and tasks.

As described in more detail below, the invention can be presented to the user through a series of screens. For example, a screen comprising a menu of the various topics (or sources) offered for study can be displayed to a user. FIG. 1 illustrates one possible arrangement, where the topics are represented by icons. Clicking on an icon retrieves a second screen—the source investigator—as shown in FIGS. 7–14. This screen enables a user to access the informational material associated with the topic and evaluate and analyze its usefulness as a source of information.

The invention can be used in a variety of settings. For instance, it can be used as a teaching tool in primary and secondary education. It can also be used as an instructional tool for analyzing data, solving logic problems, creating solutions, etc. Any suitable informational material can be utilized.

The systems, products, and methods of the invention are preferably presented as electronic-based applications, e.g., as deployed in a computer-based application. Such systems, products, and methods can be provided on the Internet, the World Wide Web, LAN, electronic storage media, such as CD-ROM, videodiscs, DVD drives, magnetic tapes, zip drives, etc.

Figure 15:
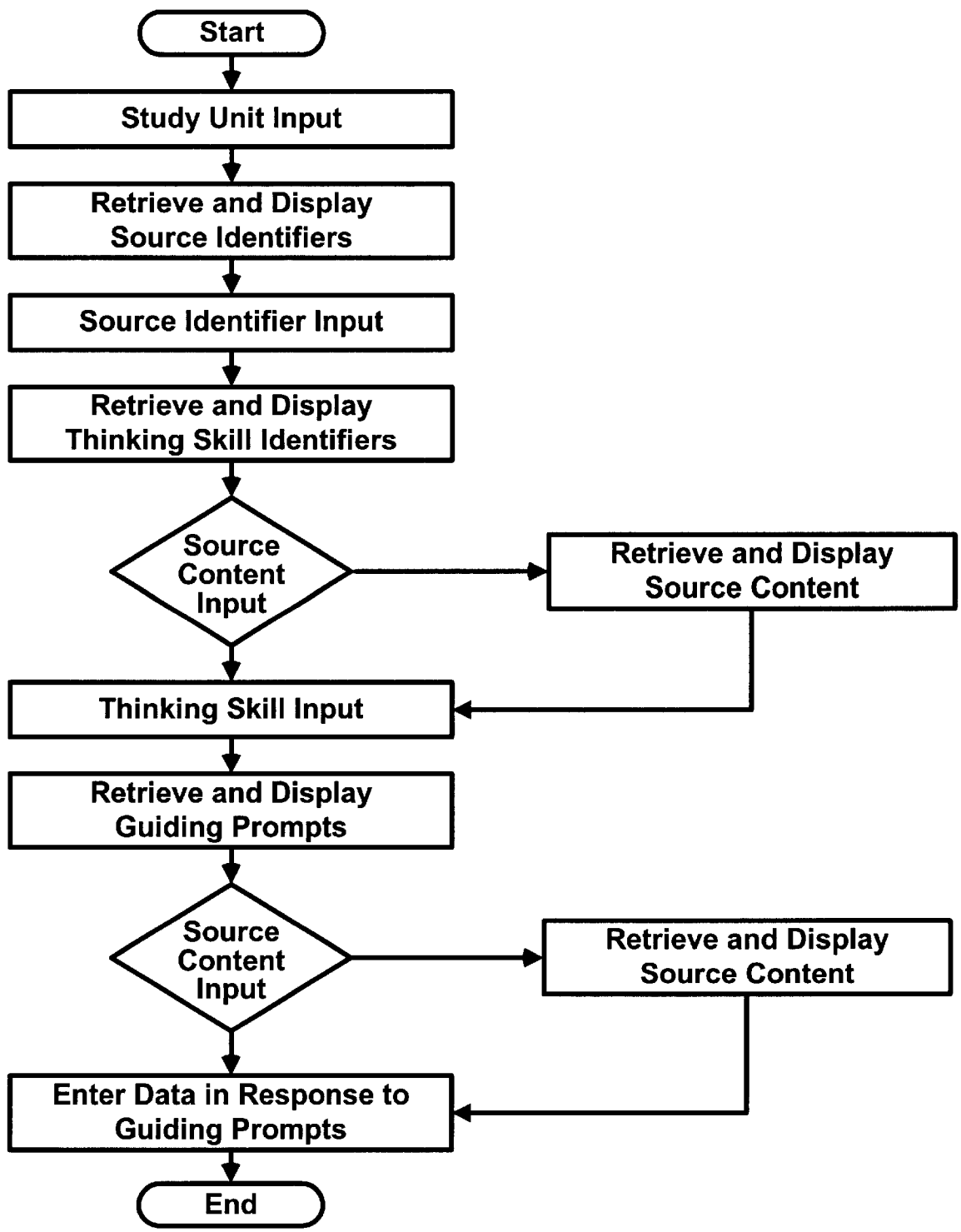
FIG. 15 is a flow diagram showing how a method of the invention can be used to investigate information on a topic while simultaneously developing thinking skills.

FIG. 15 is a flow diagram showing how a method of the invention can be used to investigate information on a topic while simultaneously developing thinking skills. The method can contain one or more of the following steps, in any order which is effective to develop thinking skills: retrieving and displaying at least one study unit, wherein said study unit comprises one or more sources, each source having a source identifier and source content; receiving study unit input comprising the selection by the user of a study unit; retrieving and displaying a plurality of source identifiers in response to received study unit input; receiving source identifier input comprising the selection by the user of a source identifier; retrieving and displaying one or more evaluation thinking skills identifiers in response to received source identifier input; receiving evaluation thinking skill input comprising the selection by a user of an evaluation thinking skill identifier; retrieving and displaying at least one guiding prompt associated with the selected evaluation thinking skill, wherein the prompt is effective in investigate the usefulness of said source content in addressing an object of an assignment.

To facilitate an understanding of the present invention, below is a discussion of the terms and their meanings used herein.

Very generally, the present invention involves "study units" and "sources." In one embodiment of the invention, a study unit can be a database of files and a source can be a file in the database. The source file, itself, can contain one or more subfiles. A "study unit" can be any desired subject, e.g., all or part of a standardized curriculum, such as history, literature, biology, language, mathematics, etc. For example, a study unit can be a specific aspect of American history, such as the Civil War, slavery, or statesmen (such as, Thomas Jefferson or Benjamin Franklin). A study unit can also relate to a course in corporate decision-making or problem-solving. A study unit is generally comprised of at least one source, preferably a plurality of sources.

Each source has a source identifier and source content. The term "source content" means, e.g., information or data. The information can be obtainable from, e.g., an original letter or document, a published book, a newspaper article, an audio recording, an art reproduction, a still or moving image, etc. The source content can contain one or more types of information, e.g., source content can be more than one picture (still, moving, etc), texts, audio clips, audiovisual outputs, or combination thereof. The content can be stored in the same, connected, linked, multiple, and/or independent files, as desired or suitable for the intended function.

A "source identifier" can be text, graphics, audio clip, a combination thereof, etc., which represent or symbolizes a particular source content of the study unit. For instance, where the study unit is slavery, the source can be text of the Constitutional Thirteenth Amendment, a biography of Abraham Lincoln, or "Notes on Virginia" written by Thomas Jefferson. The source identifier can be a title, a sound, etc., that inform the user about the nature of the source content. For example, a source identifier for "Notes on Virginia" can be a picture of a book cover, an icon, the title "Notes on Virginia," or a combination of both.

The information, data, etc., in a source can be viewed (i.e., displaying) in any desired form, including as text, graphics, a holographic, transmitted (e.g., as a laser or other energy form), auditory, or combinations thereof. The information can be stored and retrieved from any desired medium, including, e.g., tape, CD-ROM disc, DVD drivers, high or low density computer disk, videodisc, magnetic medium, network servers, or other electronic storage medium or storage means. The information can also be retrieved from the Internet, the World Wide Web, or other linked networks, e.g., a LAN. The source content can be displayed or viewed on any device compatible with its form, e.g., on a computer, through audio speakers, etc.

The invention involves retrieving and displaying, especially in response to a received input from a user. The latter terms have their customary meaning, e.g., as used in U.S. Pat. Nos. 5,713,003; 5,694,559; and 5,347,628. As mentioned, display of the information can be on any device compatible with the media, e.g., a monitor, a computer or television screen, through an audio card, etc. Retrieval of the information, e.g., from a storage means, is accomplished conventionally, e.g., using links (such as to a Web site), through symbolic language as expressed in a computer language, using printed circuits, etc. See, also U.S. Pat. No. 5,713,003.

Retrieval and display can be in response to user input, electronic input, etc. For example, retrieval and display can be accomplished by receiving input comprising the selection of a desired feature by user. For instance, in addition to its representation of the nature of source content, a source identifier also functions as a switch or button which permits a user to select a source content for further investigation. Selection of the source identifier by the user can result in retrieval and display of guiding prompts and/or the source content. For example, selecting the small picture of Jefferson by clicking with a mouse, or other pointer device, on the corresponding icon (i.e., receiving input comprising the selection of) results in the retrieval and display of its content (e.g., text) from a storage medium. A source identifier can be linked to the guiding prompts or source content by a variety of means, especially electronic means where the linking is accomplished by an electronic routine expressed in the form of a computer language. User input and receipt thereof can be accomplished conventionally. For instance, in the case of a computer program, input can be accomplished by clicking on an icon or title using a mouse, or other pointer device, or contacting an icon or title on a display screen which is pressure sensitive, etc.

The present invention also relates to the display and retrieval of thinking and other cognitive prompts and clarifications to investigate usefulness of the source content, e.g., to evaluate and analyze information. In a preferred embodiment, the invention works in the following way. A user optionally selects a source content from a menu. An example of such a menu is illustrated in FIG. 1. Selection results in display of a screen which enables the user to view and study the source content. An example of such a screen is the "source investigator" screen as depicted in FIGS. 7–14. In these examples, the upper left border of the picture icon and lower right of the screen contain buttons which enable the user to access the prompts and clarifications. Selection of a button results in the retrieval and display of a question, example, clarification, or other suitable prompt that is designed to develop thinking skills. In FIGS. 7–14, each of the buttons is labeled with a "thinking skill identifiers." A thinking skill identifier is a title, symbol, or other expression that is used to represent a thinking skill. A function of a thinking skills identifier is as a switch or button which identifies the skill and enables a user to learn the skill by retrieving a guiding prompt. When thinking skill identifiers are utilized, they can be retrieved all at once, sequentially, in sets, or combination thereof. FIGS. 7–14 illustrate the display of thinking skill identifiers all at once. However, other arrangements are suitable. For instance, each of the thinking skills can be presented sequentially to a user, through a series of linked screens.

As discussed more thoroughly below, thinking skills are used to investigate the source content. The design and choice of thinking skills and their associated guiding prompts will vary, depending, e.g., on the information which is represented and/or the assigned task. In a preferred aspect of the invention, the thinking skill enables a user to evaluate the usefulness of the source and analyze its content. For instance, a thinking skill can be used to evaluate the source content, e.g., for its relevance, credibility, consistency, bias, accuracy, ambiguity, factualness (fact or fiction?), etc. The user can also analyze the content, meaning, and/or point of view of a source content by using suitable prompts.

By the term "prompt," it is meant a hint or suggestion, e.g., a question, a query, an audio, a moving picture, etc., which lead the user to understand the thinking skill and how to apply it. For instance, when a user chooses to investigate the "relevance" of a source content, the user selects the thinking skill identifier labeled "relevance." Its selection results in the retrieval and display of a guiding information, e.g., a text or image, which is useful for investigating the relevance of the displayed source content. The guiding prompt can be formulated in any desired way which is effective to train the user in the thinking skill, e.g., selection of the "relevance" identifier can result in the retrieval and display of one or more queries, such as "Does the source identify components or parts of the study unit," and/or "Does the source support the angle of your story," etc.

The invention also comprises further explanation and/or examples of the guiding prompt. Thus, selecting or receiving input on the guiding prompt can result in the display and retrieval of a "clarification," providing additional guidance to lead the user in the application, understanding, etc. of the skill. For example, a clarification displayed on the far left for the prompt for "Does the source identify components of the study unit," can be used. Any means suitable for arranging and displaying prompts and clarifications can be utilized.

In addition to having a content and an identifier, a source can also have an attribute. An attribute is, e.g., a characteristic, quality, or property of the source. An attribute can be a calendar date (such as its date of creation, publication, etc.), the media in which it is expressed (such as audio, visual, text, its point of origin (e.g., where it came from, such as the National Archives, the Library of Congress, etc.), its ownership (e.g., public domain, copyright ownership), etc. An attribute of a source content can be visually displayed on a computer screen, For instance, a different colored border around the source identifier/and or its content can be use to show which information is in the public domain and which information is copyrighted. The source identifiers can also be sorted and displayed according to an attribute.

The present invention also relates to systems, devices, databases, storage medium, etc., for teaching thinking skills to a user, such as a student or trainee. In a preferred embodiment, the present invention is a computer-based multimedia instructional database system for teaching thinking or other cognitive processing skill. The system can be embodied on a physical object, such as a CD-ROM, which contains some or all the data useful for implementing a method as described above.

A system of the present invention can comprise various means for implementing the described steps. A "means for" can be an electronic routine as embodied in a symbolic language, such as a computer language, or on a chip. Thus, "a means for retrieving" can be, e.g., a computer program, or, an electronic circuit, that enable a user to obtain data (a source content or identifier) from an appropriate storage medium. The data can be fixed on the same object as the "means-for," or, it can be on a different object at another location, e.g., a CD-ROM or other electronic storage media, a LAN, the World Wide Web, etc. A system of the present invention can also comprise a monitor, a video display, a user input means, and other elements, e.g., as described in U.S. Pat. No. 5,310,349.

The present invention also relates to a computer-based multi-media instructional database management system for teaching thinking skills, comprising: means for retrieving and means for displaying a source identifier and a source content; and means for retrieving and means for displaying a guiding prompt, wherein said means for retrieving and means for displaying is effective to retrieve and display said guiding prompts after said source content is retrieved and displayed. For example, FIGS. 7–14 show a screen having buttons which enable a user to retrieve and display source content and to retrieve and display guiding prompts. In these examples, the source content has been retrieved and displayed. Afterwards, the guiding prompts ("guiding questions") are selected, resulting in retrieval and display of the guiding prompts. Selecting a guiding question results in the retrieval and display of a clarification.

The present invention is designed to be as extensible as possible. In this sense, the investigator capabilities can be referred to as a shell which is separate from the source content. Major portions of the shell can be modified, added to, or replaced to suit the particular needs of the content. In particular, the source content can be externally based to facilitate its rapid replacement and updating.

Users utilizing products created with the shell develop thinking skills (evaluation, analysis, and synthesis) and content knowledge while they are engaging in research activities with primary and secondary sources. The learning experience culminates in the creation of a multimedia presentation which represents the user-synthesis of the knowledge they have developed during the research phase. Users using applications developed with the software shell become investigators (in the case of the history applications they are "Thoughtful reporters"; in science, they are "Thoughtful scientists" who must prepare multimedia presentations or publications. The software shell permits developers to integrate instructor-led orientations, computer-based instruction, guided inquiry, collaborative learning, to support student center-learning.

The "Source Investigator" program (hereinafter, "SI") is made up of three basic parts: a shell program written in a coding language that allowed the programmer to take advantage of object-oriented code, a content database, and a set of external source files containing text, graphics, digitized audios, digitized videos, or other source materials. Presently, the shell program (hereinafter, "SI code") is written using a well-known commercial authoring system (such as Macromedia Director™). However, previous versions of the shell were coded in Oracle Media Objects™ and mTropolis™. As is the case with many programs, one can change the programming language in which the shell is written without changing its functions or features. The SI code may be stored on a CD-ROM or any other suitable storage medium. When the program is started, the SI code loads into computer memory and begins to execute its functions. One of its first functions is to read and retrieve data from the external content database file. The retrieved data are loaded from database records into a data array (data structure) in computer memory as a method of enhancing system performance. These data tell the SI how many sources are available, what the names and memory access codes of those sources are, and the nature of any copyright restrictions on those sources. These data help to determine both what the SI will show on its "Source Selection" screen and how the materials to be shown will be displayed. Like the SI code itself, the content database may be located on a CD-ROM or on any other suitable storage medium. The content database might even be located on a remote server and accessed over a local area network or through the Internet.

The content database contains no programming code; provided that it conforms to the SI's specified database format and obeys its rules for field length and contents, any content database may be used with the SI. The database consists of 16 fields in the following order and with the following specified content and/or length restrictions:

| FIELD NAME | FIELD TYPE | FIELD MAY CONTAIN | LIMITED TO (number of characters) |
|---|---|---|---|
| Code | Text | Any alpha/numeric | 8 |
| Short Title | Text | Any alpha/numeric | 14 |
| Title | Text | Any alpha/numeric | unlimited |
| Media Type | Pop-up | Pict Text, pict_text audio video | N/A |
| Date | Text | Numeric | 4 |
| Document Type | Pop-up | Advertisement, audio recording, book, broadside diary, documentary film, engraving, financial record, graph/chart, handbill, letter, lithograph, map, newspaper, painting, pencil drawing, pension record, petition, photograph, political cartoon, proclamation, public record, publication, sculpture, speech, stereograph, taped interview, telegram, tintype, transcribed interview, unknown other | N/A |
| Raw Version | Text | Any alpha/numeric | unlimited |
| Captured | Checkbox | Checked/unchecked | N/A |
| Transcript | Pop-up | Needed Completed n/a_source not application | N/A |
| Keywords | Text | Any alpha/numeric | unlimited |
| Producer | | Any alpha/numeric | unlimited |
| Source | | Any alpha/numeric | unlimited |
| Copyright | Pop-up | public domain unrestricted restricted obtain information | N/A |
| Held by | Text | Any alpha/numeric | unlimited |
| Annotation | Text | Any alpha/numeric | unlimited |
| Editor's suggestion | Text | 1–6 (separated by commas) | unlimited |

The "Source Selection" screen displays a subset of the sources which are available. The SI code retrieves the individual images to be displayed on the "Source Selection" screen from a "thumbnails" file located in a content unit subdirectory, either on the CD-ROM or on some other suitable storage medium. The SI code also displays a short descriptive name above each source, as well as a colored border indicating whether the source is in the public domain, has limitations upon its use because of copyright, or requires permission from its owner before it can be used outside the product (See FIG. 1). Short descriptive names and copyright information are drawn from two of the content database fields (see above). Users may see the next subset of available sources (or a previous subset) by clicking on up and down arrows.

Figure 3:
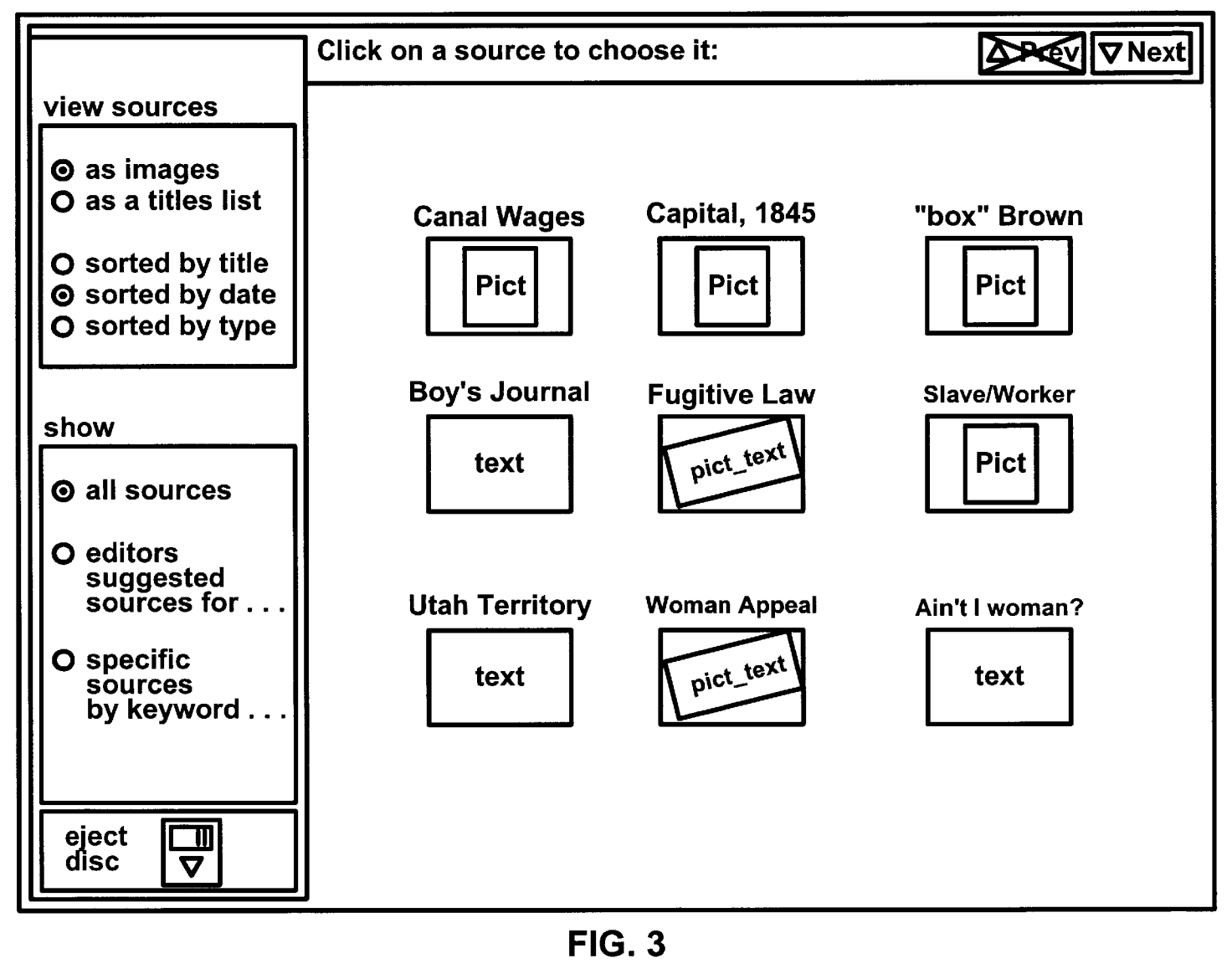
Figure 4:
FIG. 4 shows sources sorted by media type.

The "Source Selection" screen offers the user additional functions. The user may choose to have a source displayed by title as opposed to by image (See FIG. 2). When sources are displayed by title, the pointer for each source is directed at a concatenated string (presently consisting of a source's short title, its date, and the type of source—information drawn from that source's database record fields) rather than at the name of the external graphic image thumbnail file for the source. The user may sort thumbnail images (or concatenated short title strings) in a variety of ways: by date (see FIG. 3), by type (see FIG. 4), by name (alphabetically) (see FIGS. 1 & 2). In addition, the user may view all sources, a subset of sources based upon "editor's suggestions" (see FIG. 5), or a subset derived on the basis of a keyword search by title, producer, or keyword (see FIG. 6). Editor's suggestions and keywords are drawn from fields in the content database. Users make their choices by clicking on buttons on the "Source Selection" screen. The "Source Selection" screen then automatically changes what is displayed to conform to the user's choice. Sorts and source subsets are based on new derived data lists stored in memory. These lists are then used to determine which sources are displayed, in what order, and in what form.

When a user clicks on one of the displayed images on the "Source Selection" screen (or on a source's concatenated short title string when sources are displayed by title instead of image), the SI code takes the user to the "Source Investigator" screen. The "Source Investigator" screen consists of 6 main areas: (1) a display area in which graphic images, textual materials, videos, and other source materials appear; (2) a subskill button area to the left of this display area; (3) a control buttons area directly beneath the display area; (4) a second subskill button area in the bottom right hand corner of the screen; (5) a control area for Guiding Questions buttons located to the left of the second subskill button area; and (6) a display area for the user's electronic notebook, for clarifications of Guiding Questions, and for the display of definitions from the Glossary. (See FIG. 7).

On the basis of the information contained in fields of the content database, the SI code presents the user with an interface tailored to the type of source selected. The SI code does so by presenting only relevant and appropriate buttons in the control buttons area directly below the display area. For example, users who select sources that consist only of text will be presented with buttons permitting them to read the source, page up and down, and see background information (see FIG. 8); they will not, however, be presented with buttons that allow them to play audios or videos or with buttons designed to facilitate viewing of graphical images. Similarly, users who select sources that consist only of graphics will be presented with buttons permitting them to view the graphic, zoom in on the graphic, and see background information about the graphic but not buttons designed to help them read text sources (see FIGS. 9 & 10). Users who select sources that consist only of video or audio will see an interface that provides buttons permitting them to play or pause and to view background information about the source (see FIG. 11). If a source consist of both an image (or a video or an audio) and a transcript of what is shown in the image or spoken (or sung) in the video or audio, the user will see buttons permitting him or her to read that transcript in addition to the appropriate buttons for viewing the image (and zooming in on the image) or playing the audio or video (see FIGS. 12 and 14). Thus, the SI code modifies its interface automatically, and invisibly to the user, on the basis of the information about each source that is contained in the content database. The SI draws its images, text, videos, audios, and any other type of file from a series of external files. These external files are located in a series of subdirectories contained with the content database on a CD-ROM or other suitable storage medium. Such external files may be prepared using widely available commercial programs such as word processors and graphics packages. Provided that these files conform to the size and form guidelines specified for the SI and are placed in the appropriate subdirectories as specified by the developer's guidelines, they will display properly within the SI and those who prepare such files need have no computer programming skill.

The SI does not require external audio or video players. The SI code is capable of playing these without the use of additional external programs.

The "Source Investigator" screen provides a notebook function. Users may take notes in an electronic notebook displayed on the screen at the same time as a source. Users may drag a source from the display area to the notebook and information about that source will be copied into their notebook automatically (see left side of FIG. 11). They may print all of their notebook or some section of it using automatic print functions available on the screen (see FIG. 13). Users are provided with up and down arrows to permit them to move among the pages of their notebooks. Notebooks are automatically saved in plain text format in external files when the user quits the program. Such plain text format files can be opened and manipulated using any word processor.

The "Source Investigator" screen also provides a glossary/dictionary function. When users click on the "find definition" button, the cursor changes to a question mark. The user may place the question mark over a word that he or she wishes to see defined. Clicking on that word causes the SI code to compare the word to words contained in an indexed glossary. The glossary is, once again, an external plain text file contained in the content unit subdirectory. If an exact match is found in the glossary, a statement to that effect and the definition are displayed in a colored field on top of what was the notebook area and the "exact match" sound is played. If no exact match is found, but an associated match (some form of the word or a transformation of the word identified as a result of the use of any well known search procedure such as fuzzy logic) is found, a statement to that effect as well as a list of associated definitions are displayed in a colored field on top of what was the notebook area and the "associated match" sound is played. If no exact or associated match is found, a message to that effect is displayed briefly in a colored field on top of what was the notebook area and the "no match" sound is played. If users enter a string that produces too many associated matches to be stored in the temporary program memory cache, the program displays a message to that effect and asks the user to select a more specific word. If a definition is displayed, the "find definition" button changes to a "hide definition" button. Users may then remove the definition by clicking on the "hide definition" button. Users may obtain definitions for any word contained in any external text file displayed in the display area of the "source investigator" screen. They may also obtain definitions of any word contained in a clarification of a guiding question (see below). Since the glossary is an external plain text file, it may be replaced with other specialized glossaries simply by following the specifications in the developer's guidelines for creating glossaries to be used with the SI (See left side of FIG. 12 for an example of the glossary function.)

The "Source Investigator" screen contains a series of buttons beside and below the display area. These buttons currently list thinking sub-skills (also called "thinking skill identifiers" earlier in the document). When the user clicks on a thinking sub-skill button, a series of as many as five guiding questions are displayed in an area near the bottom of the screen. These questions are designed to help users analyze and evaluate the sources they are investigating. When users click on one of the guiding questions, a colored field appears on top of what was the notebook area (see left side of FIG. 14). This field contains a detailed explanation of what the question is designed to help the user discover and presents examples. The guiding questions and clarifications are contained in external plain text files located in a subdirectory on the CD-ROM or other suitable storage medium. Because these files are external, the names associated with the buttons, the guiding questions, and the clarifications may easily be changed. This means that the source investigator may easily be modified to address different aspects of thinking skills, or to address different content areas. For example, the labels on these buttons (and the associated guiding questions and clarifications) might address aspects of legal practice, aspects of business practice, aspects of military operations, types of accounting practice, or any other content lending itself to this structure of presentation and support.

The SI code tracks how long a user has been in the program (by recording the user's start and end times in memory and calculating from these two variables the elapsed time). It also tracks exactly which sources a user has examined. The code name of each source examined is captured and held in a variable list. The program compares any newly examined source's code name to those code names already in the variable list and only adds a code name to the list if it has not been previously added to that list. When the user leaves the SI, the program automatically calculates how many sources' code names are held in the variable list.

Information about length of time using the SI, names of sources examined, and the number of sources examined may be transmitted to any external program as a method of tracking user performance and progress. For example, a teacher could track how students were using their time and the breadth of their explorations of sources. A training supervisor could monitor similar behavior among trainees for whom he or she was responsible. The external programs receiving this information from the SI code could be designed to collect, sort, manipulate, and display information about multiple learners or trainees. In this fashion, teachers or others wishing to monitor progress of the larger group of learners or trainees could draw conclusions about the progress of such groups, could compare individual learners or trainees to others within the larger group, or could determine how individual learners or trainees compared with group norms.

EXAMPLE

The user finds the Source Investigator (SI) on a diskette labeled "SOURCE" on the desktop of the virtual office displayed on a computer screen. A virtual office is shown in FIG. 1. When the user inserts the SI diskette into the virtual computer and opens the first screen of the SI, they see a SOURCE SELECTION screen as show in FIG. 1. The user is then instructed to select a source. To choose a source from the panel of sources, the user places the mouse over the desired icon and clicks on it.

The area at the right of the screen shows the sources, either as a labeled graphical image (as shown in FIG. 1) or as a name or title (not shown in FIG. 1). Which of these two views a user sees is controlled by button cluster in the control area to the left of the source display area. This button cluster lets the user select VIEW BY and then either "as images" or "as a titles list." Directly below this, is another set of button clusters controlling how the sources can be sorted. As shown in FIG. 1 (left), a user can sort the sources by date, type, or title. The latter can be referred to as the source attributes discussed above. Clicking on these buttons changes the way in which the source are displayed above.

In the upper right hand corner of this control area are PAGE UP and PAGE DOWN arrows. Clicking on the appropriate arrow allows the user to display sources lower or higher in the source listing. A sound tells the user that he has reached the top or bottom of the listing.

Figure 6:
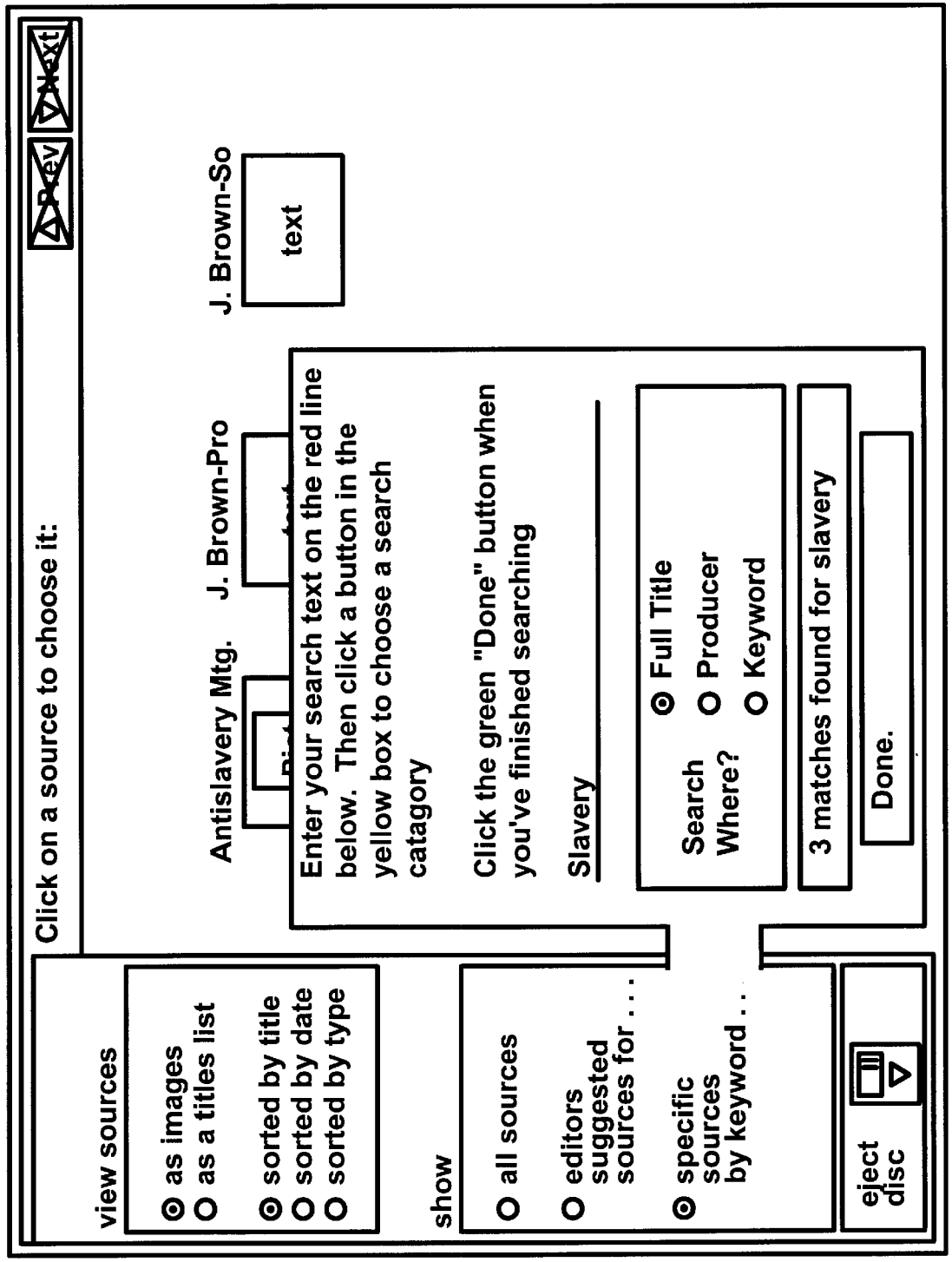
FIG. 6 shows the display of sources based on a keyword search.

A SEARCH FOR area is shown in the bottom left of FIG. 6. The button cluster to the left of the source selection screen lets the user search for sources by KEYWORD. A user types the information, e.g., a keyword, that they wish to match in the blank and clicks on the appropriate button. Users can also select a subset of the databases to view by clicking on editor suggestion. Clicking on this button will show the user a subset of the database that is appropriate to a specific assignment.

To investigate the content of particular source, a user selects (e.g., clicks on it once using a mouse or other pointer device) the desired source identifier. In FIG. 1, the user could click on the source identifier which is an icon of Thomas Jefferson (top left). When a source has been selected, the screen change to the INVESTIGATOR screen as shown in FIGS. 7–14. The source is displayed in the upper right of the screen. On the left side of the screen, once again the user sees the notebook where comments, etc., can be entered, and information about sources can be copied to the notebook by dragging them in to it.

There is one cluster of button immediately below the source, a second cluster in the center of the screen, to the left of the source, and the third cluster in the lower right hand corner. The first cluster, in the center of the screen beneath the source contains INFO, MORE INFO, READ IT, LOOK AT IT, CLOSER LOOK, and optionally PLAY and PAUSE buttons (for audio and video sources). For example, when viewing a graphical source, clicking on CLOSER LOOK will display on the screen a "zoomed-in" version of the image. From this view, clicking on the RETURN button will return to the INVESTIGATOR screen. Similarly, if the source is an illustration or a photograph of a document, clicking on the function bar READ IT button will replace the image of the source with a transcript of its text. Page up and page down buttons will appear along this cluster bar on the right side beneath such transcripts. When a source's transcript or background information is displayed, and if a graphical image of the source is available, clicking on the LOOK AT IT button will replace the text with the graphic of the source. When a source is a video or an audio source, PLAY and PAUSE buttons will appear on the cluster bar. Clicking on NEW SOURCE takes the user back to the SOURCE SELECTION screen.

When an enlarged source identifier is displayed in the context of the Investigator Screen, clicking on the MORE INFO will display relevant information about the source. CLicking on MORE INFO button (or any other button) will change what is displayed.

The second button cluster along the left side of the source display screen contains the EVALUATION buttons. Clicking on each of these will cause a set of guiding question (a type of guiding prompt to be retrieved and displayed in the bottom center area of the screen). The questions and their further clarifications which are revealed here represent the strategies for developing higher-order thinking skills. If the user clicks on a guiding question, the user will sees a CLARIFICATION displayed on top of the notebook area on the left side of the screen. Clarifications are expanded explanations (e.g., through an example) of what a guiding question is seeking to focus the user's attention on.

Clicking on a different button in the left column of the screen will cause this clarification to disappear, as will clicking on FIND DEFINITION. If a user clicks on a different guiding question, its clarification will replace the clarification previously displayed. as was the case with text displayed in the source area, clicking on a word in the CLARIFICATION area and holding the mouse down will cause the GLOSSARY function to take over.

This final button cluster at the bottom right side of the INVESTIGATOR screen is the ANALYSIS area. The button in this area operate in exactly the same way as the button in the EVALUATION area, although the investigational focus of the messages displayed is different, e.g., for analyzing the content, meaning, and/or point of view of the source content.

At any time that text is displayed in the source area, clicking on FIND DEFINITION, and then on a word, will cause the GLOSSARY function to take over. This function will do a search of the program's glossary ( scored, e.g., on a CD-ROM or any other electronic medium) and will display any matching information on the right-hand side of the screen on top of the notebook. Once a user clicks on HIDE DEFINITION, this definitional information will disappear.

The user can enter text or copy information into the notebook. There is a PRINT NOTEBOOK function above the left side of the screen. The notebook can be a shared work space that can be accessed on a computer hard drive, LAN, or over the Internet. The button at the bottom of the notebook is labeled EJECT DISK. When the user clicks on this, the user hears the sound of the disk being "ejected" and is returned to the virtual office view.

User of the shell (the SI does not teach planning; the latter is done in the assignment course which is outside the SI but can be included on the same CD-ROM or other storage media device) can learn how to structure a plan for accomplishing an assignment and are assisted in carrying out the steps necessary in completing that assignment. In carrying out that plan, users develop skills in the evaluation, analysis, and synthesis of information. By using the SI, users learn to investigate sources, meaning that they evaluate them for usefulness in addressing the objective of the assignment (e.g., topic, audience, and angle in a specific assignment), then analyze the content and meaning and derive information which helps the student complete the assignment (e.g., solve the problem). When users decide they have evaluated and analyzed a sufficient number of sources they move to step four of the problem-solving strategy and are required to synthesize the information and communicate that synthesis (in the form of an argument) to their classmate or their teacher. The steps in process are as follow:

SKILL ONE: Evaluating: Determining usefulness of Sources. To determine how useful a source is in completing an assignment, users learn the skill of evaluation. They learn to determine the relevance, credibility, internal consistency, factual accuracy, distinguish statements of fact from opinion and value judgments, and detect ambiguity, and bias of any source. Users use the support features of the software to help them make decisions about a source's utility in term of these seven criteria. Once users feel they have analyzed a sufficient number of sources, they begin to weight the evidence found and look for patterns. This in turn, may lead to eliminating some sources already examined or to investigating additional sources. As part of the overall instructional model, coaching can be available for various Thinking sub-skills, e.g., seven sub-skills in evaluation and three sub-skills of analysis. There are also three direct instruction modules available which are "courses" in determining relevance, credibility, and accuracy that will be available to the users as they complete assignments. Direct instruction modules are also available for interpreting graphs and synthesizing information, as well as modules on decision-making and other areas. These criteria are described in greater detail below:

SUB-SKILL 1: Determining Relevance. Relevance means finding that information can be used to help the user complete an assignment or other objective. If a source is relevant, it has significant and demonstrable bearing on the matter at hand; affording evidence that tends to prove or disprove the matter at issue-germane, pertinent, applicable, apposite, apropos.

SUB-SKILL 2. Establishing credibility. Credibility means that a source offers reasonable grounds for being believed. It is trustworthy or reliable. (To establish credibility, the user may need to explore who produced a source, why, and how.)

SUB-SKILL 3. Determining internal Consistency. Internal Consistency means there is agreement or harmony in the statements that are made in a source. The parts fix together easily without contradicting each other.

SUB-SKILL 4. Establishing factual Accuracy. Accuracy means that information is free of mistakes or errors. It is correct.

SUB-SKILL 5. Distinguishing Statements of fact from opinions and value judgements. Statements or fact are objective and not subject to the beliefs of the individual. They refer to actual occurrences, testable realities, or thing that can be proven to be correct or real. On the other hand, opinions are subjective and reflect what the individual believes.

Opinions are views, judgments, beliefs, convictions, or personal appraisals. Sources may contain both fact and opinions. It is important that the user determines which is which and, if there are opinions, if they are reasoned and well founded. Also remember the opinion of someone who is an expert on a topic or who was close to an occurrence may be more reasoned and informed than someone who is not as knowledgeable. Value judgments assign a value (good or bad) to an event or a situation.

SUB-SKILL 6. Detecting bias. Bias is a slanted point of view, a personal or unreasoned distortion of judgment, one-sidedness. When examining a source, look for patterns of bias that make it clear that the information in the source is really distorted.

SUB-SKILL 7. Detecting ambiguity. When some thing is ambiguous, it means it could be interpreted into more than one way, or could have more than one meaning. If a source uses words that are unclear, confusing, or vague, or it uses unusual or very specialize words, it may be difficult to interpret. Using a source that is ambiguous may not lead to the results the user wants want.

SKILL TWO: Analyzing for Content, Meaning, and Point of View. When users decide that a document is useful to a task at hand, they will proceed to determine the content and the meaning of the document, and how it contribute to the task at hand. They will then proceed to determining the point of view of the author/producer. These three criteria are describe below:

SUB-SKILL 1. Grasping the content. Content refers to a specific materials or elements (terms, facts, date, etc.) about a subject that are discussed or explained by a source.

SUB-SKILL 2. Determining the meaning. Meaning is the idea that a piece of information or picture conveys to the mind that gives the reader or viewer a sense of the significance of an event or issue. Beyond obtaining facts, details, and examples from sources, you are also looking for information that will help you interpret this information and provide meaning for your audience.

SUB-SKILL 3. Recognizing point of view. Point of view is the position from which objects or principles are viewed and according to which they are judged. A point of view is a perspective or viewpoint. Understanding the producer's point of view enables us to better interpret the meaning of a document. Point of view is usually a function of the producer's life experiences, including education, occupation and interests. We are not likely to have access to this information about most of the producers of sources we use. We can, however, detect the point of view by looking carefully at the words, images, generalizations, and metaphors that are used in the source as well as by determining, if possible the producer's motivation for creating the source.

SUB-SKILL 4. Analyzing charts and graphs. Another analysis skill is the ability to interpret charts and graphs. Specifically how charts and graphs are labeled, how the elements of the charts and graphs intersect and what kind of story the chart or graph is telling with different represent of data. Student need to be able to look at the chart or graph and to decode the message that is being conveyed by the chart or graph both so that they can find the information but also so they know how to construct an effective chart or graph.

SKILL THREE: Synthesizing and Communicating. When users have completed their selection and analysis of source material, they will be prompted through a two-step process: constructing an argument and putting together a presentation. These two steps are described below:

SUB-SKILL 1. Constructing an argument. State claims/assertions/conclusions supported by significant and logical reasons.

SUB-SKILL 2. Creating a presentation (multimedia). Something set forth for the attention of the mind. An immediate object of perception, cognition, or memory.

Without further elaboration, it is believe that one skilled in the art can, using the preceding description, utilize the present invention to its fullest extent. The preceding preferred specific embodiments are, therefore, to be constructed as merely illustrative, and not limiting of the remainder of the disclosure in any way whatsoever. The entire disclosure of all applications patents and publications, cited above and in the figures are hereby incorporated by reference.

A portion of this document contains material which is subject to copyright protection. The copyright owner has no objection to the facsimile reproduction by anyone of the patent document or the patent disclosure, as it appears in the Patent and Trademark patent file or records, but otherwise reserves all copyrights whatsoever.

What is claimed is:

1. In a computer system for providing instruction in thinking skills, the method comprising:

retrieving and displaying at least one study unit, said study unit comprising one or more sources, each source having a source identifier and source content;

receiving study unit input comprising the selection by the user of a study unit;

retrieving and displaying a plurality of source identifiers in response to received study unit input;

receiving source identifiers input comprising the selection by the user of a source identifier;

retrieving and displaying one or more evaluation thinking skills identifiers in response to received source identifier input;

receiving evaluation thinking skill input comprising the selection by a user of an evaluation thinking skill identifier retrieving and displaying at least one guiding prompt associated with the selected evaluation thinking skill, wherein the prompt is effective in investigating the usefulness of said source content in addressing an object of an assignment.

2. A method of claim 1, wherein the evaluation thinking skill is for investigating relevance, credibility, internal consistency, accuracy, factualness, bias, or ambiguity of the source content.

3. A method of claim 1, further comprising:

retrieving and displaying one or more analysis thinking skill identifiers in response to receive source identifier input;

receiving analysis thinking skill input comprising the selection by a user of an analysis thinking skill identifier retrieving and displaying at least one guiding prompt associated with the selected analysis thinking skill, wherein the prompt is effective to the investigate the usefulness of said source content in addressing an objective of an assignment.

4. A method of claim 3, wherein the analysis thinking is for investigating content, meaning or point of view of said source content.

5. A method of claim 1, further comprising:

receiving guiding prompt input comprising the selection by a user of a guiding prompt;

retrieving and displaying a clarification in response to received guiding prompt input.

6. A method of claim 1, further comprising:

after receiving said source identifier input, retrieving said source content, or a part thereof, from a storage medium and displaying it.

7. A method of claim 6, wherein said source content is retrieved as a text, image, audio, or a combination thereof.

8. A method of claim 1, wherein the source content comprises a plurality of files, each file which is independently retrievable.

9. A method of claim 1, wherein said source identifier is displayed on a monitor as a graphic image, a written text, or both.

10. A method of claim 1, where in there are a plurality of sources, each having a different source identifier and a different source content.

11. A method of claim 10, further comprising sorting said sources by a source attribute.

12. A method of claim 11, wherein said source attribute is a calendar date, the source identifier of said source, the medium type in which said source content is expressed, the point of origin of said source, or the ownership of said source.

13. A method of claim 1, wherein a source is associated with at least one keyword and said method further comprises searching for the presence of a keyword in a plurality of sources.

14. A method of claim 1, further comprising:

said user responding to said guiding prompt by entering data into a storage medium.

15. A method for providing instruction in thinking skills comprising:

retrieving and displaying a plurality of source identifiers;

receiving source identifier input comprising the selection by a user of a source identifier;

retrieving and displaying one or more high order thinking skill identifiers in response to received source identifier input;

receiving thinking skill input comprising the selection by a user of a higher order thinking skill identifier;

retrieving and displaying at least one guiding prompt associated with the selected higher order thinking skill, wherein the prompt is effective to investigate the usefulness of said source content in addressing an objective or an assignment.

16. A computer-based multi-media instructional database management system for teaching thinking skills, comprising:

means for retrieving and means for displaying a source identifier and a source content; and means for retrieving and means for displaying a guiding prompt;

wherein said means for retrieving and means for displaying is effective to retrieve and display said guiding prompts after said source content is retrieved and displayed, said guiding prompt associated with the selected evaluation thinking skill, the prompt being effective in investigating the usefulness of said source content in addressing an object of an assignment.

17. A system of claim 16, further comprising:

an information data storage medium upon which study unit data is stored, wherein the study unit comprises one or more sources, each source having a source identifier and a source content.

18. A system of claim 16, wherein the guiding prompt is a text or audio file comprising data for investigating the usefulness of said source content.

19. A system of claim 16, wherein the usefulness of the meaning or point of view of said source content is investigated.

* * * * *